US007840495B2

(12) United States Patent
Levenson et al.

(10) Patent No.: US 7,840,495 B2
(45) Date of Patent: Nov. 23, 2010

(54) SYSTEM AND METHOD FOR THE PAYMENT AND ACCOUNTING OF PETTY DISBURSEMENTS

(76) Inventors: Jay Levenson, 38 John Singer Sargent Way, Marlton, NJ (US) 08053; Sherri Adler, 456 W. 57th St., #2A, New York City, NY (US) 10019

( * ) Notice: Subject to any disclaimer, the term of this patent is extended or adjusted under 35 U.S.C. 154(b) by 814 days.

(21) Appl. No.: 09/921,629

(22) Filed: Aug. 3, 2001

(65) Prior Publication Data
US 2003/0028492 A1    Feb. 6, 2003

(51) Int. Cl.
*G06Q 99/00* (2006.01)
(52) U.S. Cl. .............................. 705/65; 705/41; 705/64; 705/68; 705/78; 705/79; 713/150
(58) Field of Classification Search ............... 705/26, 705/42, 44, 35, 41, 64–79; 235/380; 713/150
See application file for complete search history.

(56) References Cited

U.S. PATENT DOCUMENTS

| 4,319,336 | A | | 3/1982 | Anderson et al. | |
|---|---|---|---|---|---|
| 5,610,981 | A | | 3/1997 | Mooney et al. | |
| 5,796,827 | A | | 8/1998 | Coppersmith et al. | |
| 5,826,243 | A | * | 10/1998 | Musmanno et al. | 705/35 |
| 5,903,830 | A | * | 5/1999 | Joao et al. | 455/406 |
| 5,914,472 | A | * | 6/1999 | Foladare et al. | 235/380 |
| 5,960,411 | A | | 9/1999 | Hartman et al. | |
| 5,970,475 | A | * | 10/1999 | Barnes et al. | 705/27 |
| 5,991,413 | A | * | 11/1999 | Arditti et al. | 705/77 |
| 6,000,608 | A | | 12/1999 | Dorf | |
| 6,098,053 | A | * | 8/2000 | Slater | 705/44 |
| 6,108,641 | A | * | 8/2000 | Kenna et al. | 705/35 |
| 6,173,269 | B1 | * | 1/2001 | Solokl et al. | 705/35 |
| 6,339,765 | B1 | | 1/2002 | Maher | |
| 6,353,811 | B1 | | 3/2002 | Weissman | |
| 6,529,885 | B1 | * | 3/2003 | Johnson | 705/64 |
| 6,606,606 | B2 | * | 8/2003 | Starr | 705/36 R |
| 6,636,833 | B1 | * | 10/2003 | Flitcroft et al. | 705/1 |
| 2001/0013018 | A1 | * | 8/2001 | Awano | 705/41 |
| 2002/0099659 | A1 | * | 7/2002 | Swentor | 705/44 |
| 2003/0028481 | A1 | * | 2/2003 | Flitcroft et al. | 705/39 |
| 2003/0120571 | A1 | * | 6/2003 | Blagg | 705/35 |
| 2003/0216990 | A1 | * | 11/2003 | Star | 705/35 |

OTHER PUBLICATIONS

Pays et al., An intermediation and payment system technology, 1996, Elsevier Science B.V., Computer Networks and ISDN Systems, pp. 1197-1206.*

(Continued)

*Primary Examiner*—Jalatee Worjloh
(74) *Attorney, Agent, or Firm*—Buchanan Ingersoll & Rooney PC

(57) ABSTRACT

A system and method for the payment of petty cash disbursements is disclosed wherein a tree structure of linked purchasing cards is constructed according to a real-life organizational structure of persons able to authorized the expenditures of the petty cash. A central computer facility is used to maintain the structure and to facilitate the modification of the expenditure limits for the purchasing cards and the movement of cash between a master account and the accounts of each of the purchasing cards to cover purchased made thereby.

28 Claims, 8 Drawing Sheets

OTHER PUBLICATIONS

CardWeb.com, Inc.—The Global Payment Card Information Network, http://www.cardweb.com/main.html.

PayPal—The Way to Send and Receive Money Online, http://www.x.com/.

Welcome to NextCard—The Easiest Way to Buy Anything Online!, http://www.nextcard.com/index1.shtml?UTID=317898333355530200.

CobaltCard: The PrePaid Buying Card from American Express, http://www.cobaltcard.com/cobaltindex.html.

MasterCard Small Business Connections, http://www.matercardintl.com/business/smallbiz/.

Common Electronic Purse Specifications (CEPS)—Visa-Visa Cash—What's new, http://www.visa.com/pd/cash/ceps.html.

Maestro Debit Card, http://www.offshore-manual.com/MaestroDebitCard.html.

American Express Personal Card, Financial, and Travel Products, http://www.americanexpress.com/homepage/personal.shtml.

Discover Card, http://www.discovercard.com/.

Mondex, http://www.mondex.com/webcode/common/contents.asp?ID=45.

RPPS | Learn More, http://www.mastercardintl.com/rpps/solutions.html.

Payment Processing: A Beginners Guide—http://ecommerce.about.com/library/weekly/aa031000a.htm?terms=.

RPPS Mastercard Remote Payment and Presentment Service—http://www.mastercardintl.com/rpps.

MasterCard International Press office—http://www.mastercardintl.com/about/press/factshee.html.

Visa USA | Personal | Visa Cards—http://www.usa.visa.com/personal/cards/index.html.

MarketResearch.com—Financial Services—Credit/Smart Cards—http://www.marketresearch.com/browse.asp?categoryid=426.

Hartigan, John, Rusek, Susan and Forlenza, Sam, Suny Buffalo MBA Students on Mondex, Oct. '97—http://wings.buffalo.edu/academic/departrnent/som/isinterface/mondex.

Edwards, Christine A., Horizontal Issues Relating to Networks in the Credit and Charge Card Industry, Dec. 1, 1995—http://www.ftc.gov/opp/global/caeftc.htm.

"Emerging Electronic Methods for Making Retail Payments—Stored-Value Cards"—http://woodrow.mpls.frb.fed.us/sylloge/cbo2.html.

"Comparative Review of Laws and Voluntary Codes Relating to Certain Aspects of Consumer Protection in Electronic Commerce", http://www.piac.ca/newpage21.htm.

About—The Human Internet—http://www.about.com/.

Wolverton, Troy, "Priceline.com Files Suit Against Microsoft", Oct. 13, 1999—http://news.cnet.com/news/0-1007-200-851952.html.

Luening, Erich, "Amazon Wins First Round in Barnesandnoble.com Suit", Dec. 2, 1999—http://news.cnet.com/news/0-1007-200-1476392.html.

Junnarkar, Sandeep, "Marketing Rival Sues to Quash DoubleClick Patent", May 18, 2000—http://news.cnet.com/new/0-1005-200-1894013.html?tag=st.ne.1007-2.

Junnarkar, Sandeep, "Amazon Sues Barnesandnoble.com Over Patent", Oct. 22, 1999—http://news.cnet.com/news/0-1007-200-922281.html.

Clark, Tim, "Are E-Commerce Patents Patently Absurd?", Feb. 5, 1999—http://news.cnet.com/news/0-1007-200-338350.html?tag=st.ne.ni.rnbot.

Clark, Tim, "Who's Got the Patent?", Feb. 5, 1999—http://news.cnet.com/news/0-1003-200-332600.html?tag.

Keysan Petty Cash Forms—http://www.keysan.com/ksu1258.htm.

* cited by examiner

SYSTEM AND METHOD FOR THE PAYMENT AND ACCOUNTING OF PETTY DISBURSEMENTS

FIELD OF THE INVENTION

This invention related to the disbursement of small sums of cash for the purchase of miscellaneous items, often referred to as "petty cash" and, in particular, outlines a novel system and method wherein petty disbursements are performed via a credit/debit card type instrument which has a unique system and method of support for operations such as purchase authorization, accounting and reconciliation.

BACKGROUND OF THE INVENTION

Many cash-intensive industries currently use a "petty cash" system of disbursement for the purchase of small or quickly-needed items. The major advantage of the "petty cash" system is that cash is accepted almost anywhere and can be controlled by procedures commonly known in the art. The use of cash is a tradition in many industries that has it roots in the days well before credit and debit cards were even envisioned.

The entertainment production industry is typical of industries wherein cash is the predominant medium for purchasing billions of dollars of goods and services. Large sums of money are maintained as petty cash for use in procuring everything needed for producing movies, plays, commercials, and television shows. For the purposes of this document, the entertainment production industry will be used as an illustrative example. The entertainment industry has evolved procedures for managing petty cash that reflect the organization of the typical production. The procedure begins with the formation of a production company established to produce the single movie, play, commercial, or television show. This company is funded from the accounts of a studio, network, or other existing entity depending on the production type. An internal organizational structure is established as typified by FIG. 1.

Once in operation, the production accountant withdraws funds from the bank in accordance with the projected cash needs of the company. The heads of each department are allotted the funds planned in the production budget by the production accountant. They in turn, allocate the funds to their subordinates as needed.

Chits are used to authorize and track the disbursement of the cash. The user of the cash must appear at the disbursement location to sign for and obtain the cash. At some point, the users must reappear to return unused cash and present proof of valid cash usage. The accountant must then reconcile the total disbursements with the budget and with the cash drawer. This process is repeated time and again during the life of the production company.

Problems with petty cash systems have arisen with the advent of more stringent banking regulations enacted to limit money-laundering activities. These regulations require additional paperwork when completing a cash transaction of $10,000 or more. This limit is scheduled to be tightened even more in the near future. Since many productions use much more than this on a daily basis, and since the processing required to exceed this limit is cumbersome, more and more frequent cash withdrawals are made. This consumes an ever-increasing amount of administrative time. Additionally, the complexity of productions is increasing, thus causing the expenditure of even more time in budgeting, issuing, and reconciling cash.

It would therefore be desirable to have a system of petty disbursements which is easier to establish, control, track and maintain.

SUMMARY OF THE INVENTION

The entire petty cash paradigm must be changed in light of the increasing burden that the use of cash places on any organization. The system and method disclosed herein is intended to replace the use of petty cash with purchasing cards that can be managed in real-time by the controller of a company's cash. The controller will be able to dynamically control the card status and adjust the expenditure limit on each card over which he or she exercises administrative control. The cards will fall into two general categories: permanent and temporary. Permanent cards will be issued in the name of the cardholder while temporary cards will be issued in the name of the company. Cardholders will provide their personal account number when hired by a company. The cards will be used at points of sale just as a regular credit or debit card, and will appear to a merchant as any normal credit card transaction. Cardholders will reconcile their card usage via the system disclosed herein.

Withdrawals are accomplished from a personal computer instead of by visiting a bank branch. Withdrawn funds are moved to the account of the production company accountant instead of to a cash drawer. Funds are then allocated to subordinate accounts by computer instead of reaching into a cash drawer. This process requires only a personal computer and Internet access and can therefore be accomplished from practically anywhere. Alternative access is provided by a voice response unit and by web-enabled devices such as digital wireless telephones.

The budgeting and planning process is accomplished on-line using standard and customized templates for the organization. During the hiring process, the employee provides their account number for use during their period of employment.

Instead of using cumbersome paper forms, the present invention allows the user to request funds from their superiors via computer. The users reconcile by computer using a process similar to a checking account register, thereby minimizing the time spent travelling to the accounting office.

Any authorized account holder can view their own account status and those of their subordinates via the Internet. Accounting staff can request a download of the current state of the entire production company account, top to bottom. The downloaded file is importable into many standard accounting systems and spreadsheets. This eliminates the need for double entry of all information.

DESCRIPTION OF THE DRAWINGS

FIG. 5 is an upper-level diagram of the Processing subsystem of the present invention.

DETAILED DESCRIPTION OF THE INVENTION

It is assumed that an entity will be established to implement the invention disclosed herein. This entity, referred to herein as "the managing entity," will be responsible for performing the unique features of the invention, running and maintaining the computer systems on which the system software is run, and all other functions described hereinafter.

Figure 2:
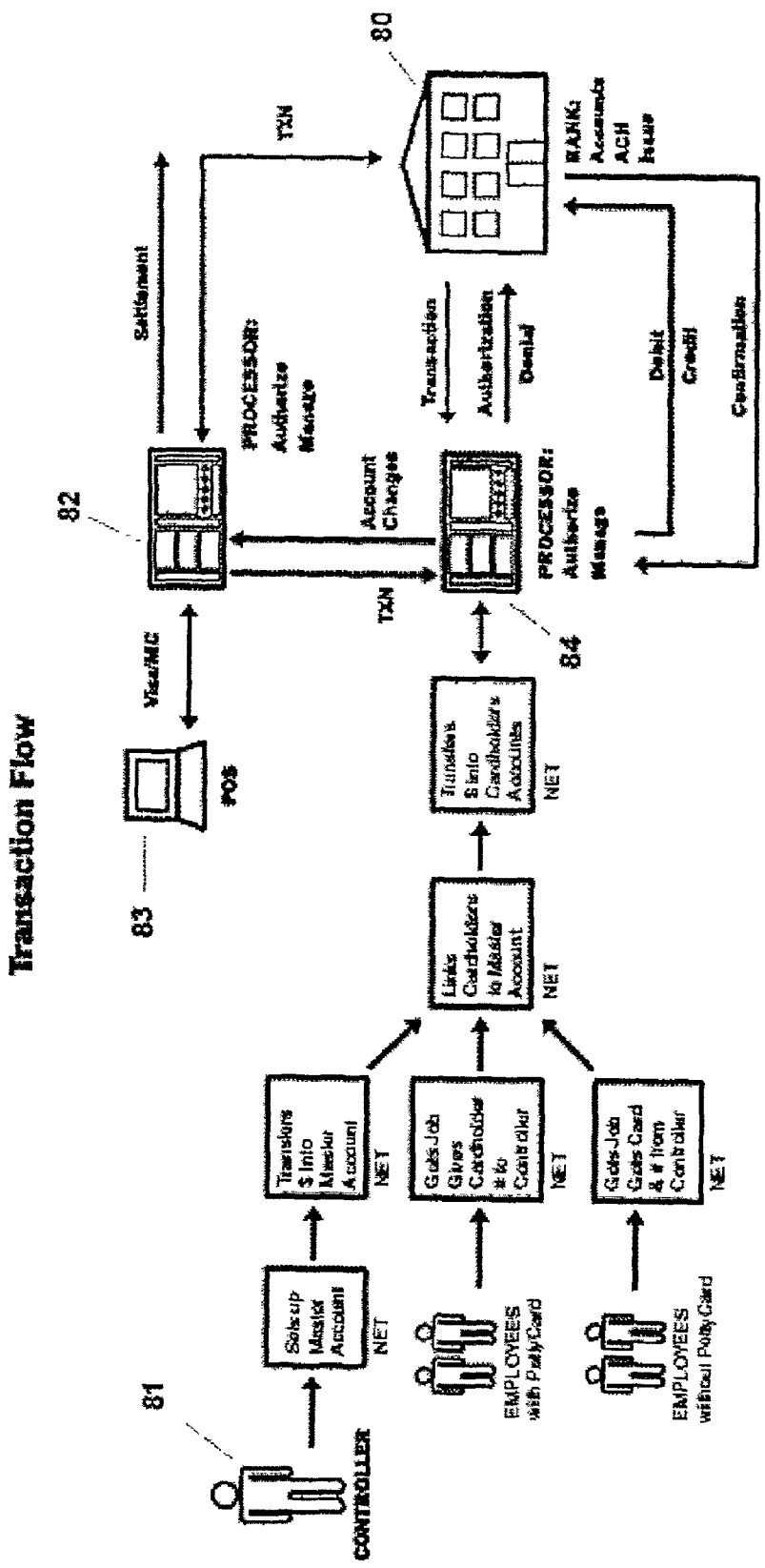
FIG. 2 is an upper level systems overview of the system and method of the disclosed invention.

FIG. 2 shows a generalized view of the system of the current invention. The central entity in the system is processor 84, which implements the novel aspects of the invention. To use the system, controller 81 must set up a master account at the bank 80 and transfer cash into the master account. Individual purchasing cards held by employees are then linked to the master account and provided with an expenditure limit. When an employee makes a purchase at point of sale 83, the purchase is approved by credit card processor 82 who informs processor 84 and bank 80 of the transaction. Processor 84 has knowledge of the links between the cards and can institute dynamic changes to the accounts by contacting credit card processor 82. An example of an account change would be a change in an expenditure limit allowed by a particular card holder. Processor 84 also sends instructions to bank 80 to debit or credit individual employees cards to cover purchases made by the cardholders.

Figure 3:
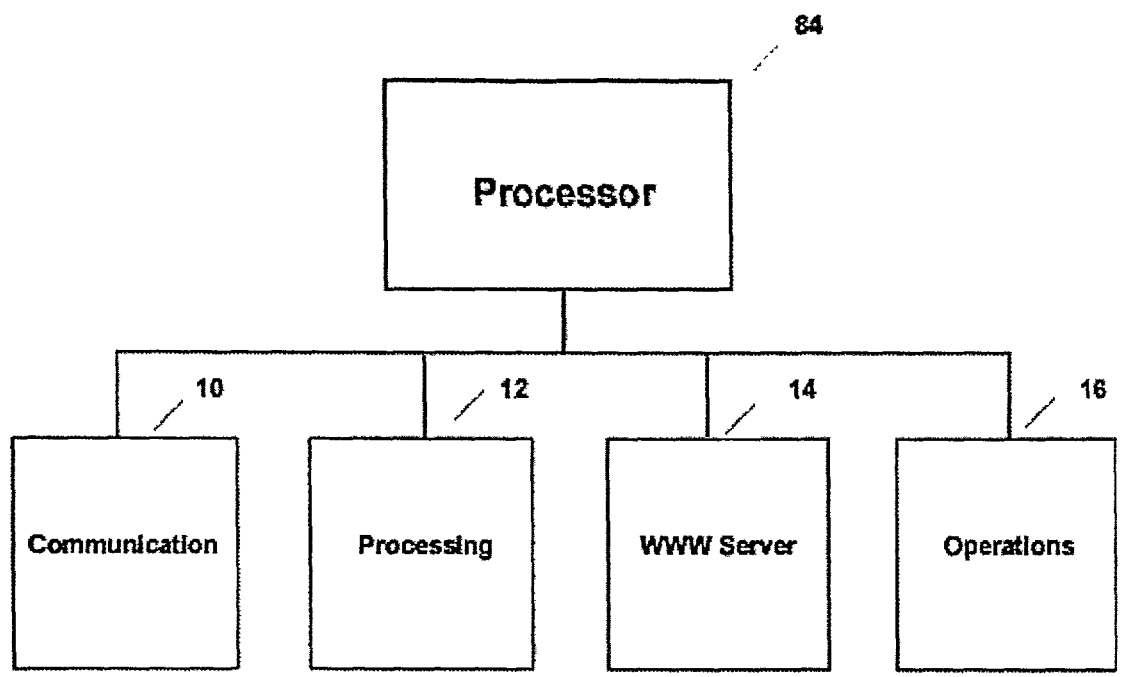
FIG. 3 is an upper-level diagram of the system of the disclosed invention.

FIG. 3 is a top-level structural diagram showing the systems processing elements and their relationship to central processor 84. The top level of the system comprises four main components, which include the Communication Compute Element (CCE), the Processing Compute Element (PCE), the WWW Server Compute Element (WCE) and the Operations Compute Element (OCE), shown as reference numbers 10, 12, 14 and 16 respectively. The functionality of the system of the invention is hereinafter described, organized by the four compute elements 10, 12, 14 and 16.

Figure 4:
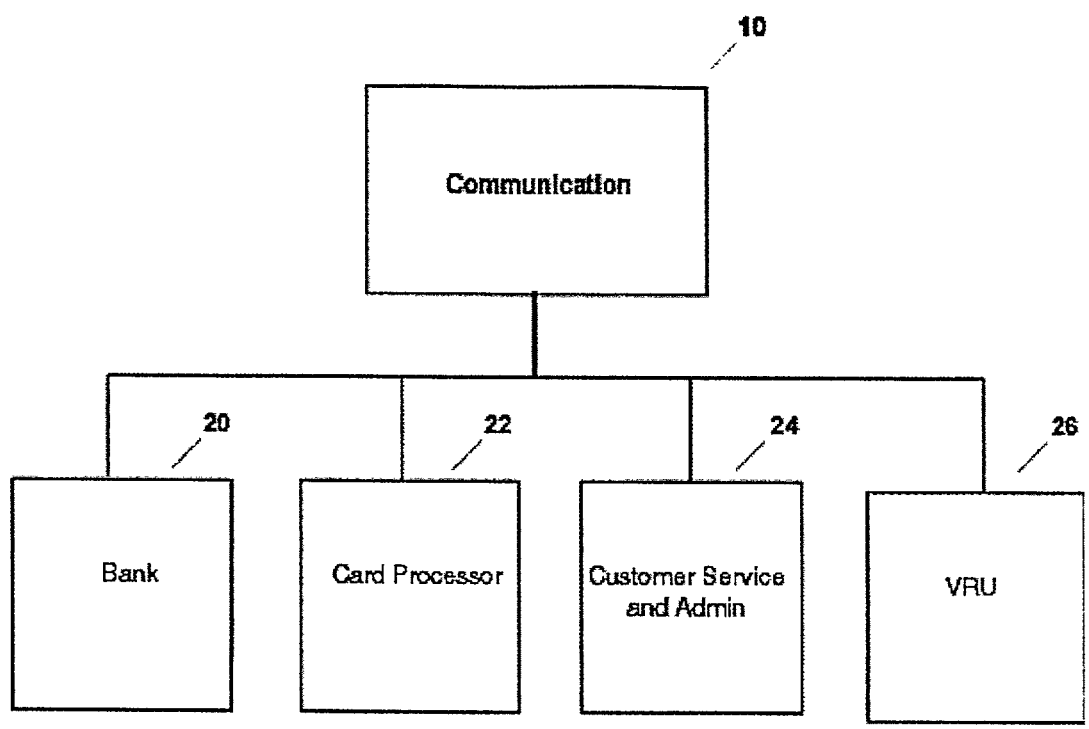
FIG. 4 is an upper-level diagram of the Communications subsystem of the present invention.

CCE 10 is responsible for all communications between processor 84 and any external entities. FIG. 4 shows the level 2 structure of CCE 10. Processor 84 has four main external interfaces: a bank interface 20, which communicates with a cooperating bank 80, a card processor interface 22, which communicates with a card processor 82, a customer service and administrative interface (CSA) 24, and a voice response unit (VRU) 26. All sub-elements of CCE 10 are responsible for several common functions which are necessary for the proper operation of CCE 10.

First, with respect to security, each interface sub-element of CCE 10 will maintain a level of communication security commensurate with the handling of large sums of money. Data transfers will be encrypted and decrypted using methods known in the art, and will use appropriate means of identification and authentication in accordance with the requirements of the bank. Attempted violations of the security protocols will be immediately reported. Second, each interface sub-element will maintain a log of all communications, for audit and customer support purposes. Third, the performance of each interface will be monitored, and sub-standard performance will be reported. Lastly, each interface sub-element will be responsible for sending and receiving data from the entity being interfaced with.

Cooperating bank 80 provides all monetary account services, including maintenance of the user companies' master account and individual card accounts. Bank interface 20 is responsible for data communications with cooperating bank 80. The data communications protocol, record format and physical characteristics of the communications media can be of any format well known in the art, may be of a format specified by cooperating bank 80 or may be proprietary. The data exchanged between processor 84 and cooperating bank 80 may consist of bank account transaction requests, balance inquiries, card transactions, logon requests, logoff requests, end of day file, reconciliation data, and administrative information. Bank interface sub-element 20 shall route data between CCE 10 and other components of processor 84, according to the type of data involved.

Cooperating card processor 82 provides card management and usage services for the purchasing cards. Card processor interface sub-element 22 is responsible for data communications between processor 84 and cooperating card processor 82. As with the bank interface sub-element 20, the data communications protocol, record format and physical characteristics of the communications media can be of any format well known in the art, may be of a format specified by cooperating card processor 82 or may be proprietary. The data exchanged between processor 84 and cooperating card processor 82 may consist of account limit change requests, card transactions, logon requests, logoff requests, end of day file, reconciliation data and administrative information. Card processor interface sub-element 22 shall route data between CCE 10 and other elements of processor 84, according to the type of data involved.

Customer services responds to user inquiries and handles administrative issues. CSA 24 is responsible for communication between processor 84 and the customer service and administrative staff. The data transferred over this interface may include account limit inquiries, account limit change requests, account balance inquiries, account balance change requests, card transaction inquiries, adjustment requests, logon requests, logoff requests, application requests, application approval status inquiries, administrative data inquiries, and administrative data change requests. CSA 24 will route data between CCE 10 and other elements of processor 84, according to the type of data involved.

VRU 26 provides ubiquitous access to processor 84 through touch-tone telephones. All users will have some functionality available through VRU 26 in accordance with their authority, privileges and limits. A controller will be able to initiate basic financial control actions. A manager will be able to change individual account limits and status. A card holder will be able to determine their current limits and balance available. The data transferred may consist of account limit inquiries, account balance change requests, card transaction inquiries, adjustment requests, logon requests, logoff requests, application requests, application approval status inquiries, administrative data inquiries, and administrative data change requests. VRU sub-element 26 will route data between CCE 10 and other elements of processor 84 according to the type of data involved.

Processing Compute Element (PCE) 12 is responsible for all transaction processing related functions within processor 84. FIG. 5 shows the level 2 structure of PCE 12.

PCE 12 is the heart of processor 84. All data from all other elements must eventually reach PCE 12. PCE 12 maintains all databases, generates reports, and provides data for use in all other elements. To organize these varied functions, the functionality of PCE 12 is subdivided into eleven separate sub-elements, each of which is will now be discussed.

Database Management sub-element (DBM) 31 is responsible for controlling access to all databases used by processor 84. DBM 31 provides the unified set of database access services that are required by processor 84. Functions are typical database operations which are well known in the art, such as database search, creation, open, read, write, close, copy, append, delete and merge.

Maintenance sub-element 32 is responsible for pre-planned file maintenance functions. This sub-element provides the set of functions required for orderly control of a log file creation, daily backup and deletion, end of day file transfers, pre-planned database updates, pre-planned web site content updates and pre-planned reconfigurations of processor 84.

Reports sub-element is 33 is responsible for generating system reports. This sub-element provides the standard and ad hoc reporting functions of processor 84.

Customer service sub-element 34 is responsible for responding to all customer service requests. This sub-element provides customer service support functions for master account application status, balance inquires and adjustments, individual account application status, balance inquiries and adjustments, point of sale transaction reconstruction, administrative transaction reconstruction and ad hoc report requests.

Administration sub-element 35 is responsible for responding to all administration requests. This sub-element provides access to all customer support functions as well as administrative support functions for master account application submission, minimum balance setup, suspension, release, cancellation, and controller authorization, individual account application submission, approval, suspension, release, and cancellation, individual additional card requests, approval, suspension, release, and cancellation and ad hoc report requests.

Transaction processing sub-element 36 is responsible for processing all transaction data. This sub-element processes transactions received from card processor 82 or bank 80. It associates the transaction with the master account to which the individual cards were attached at the time of the transaction. To accomplish its task, it identifies the attached master account, updates the individual and master account databases, and records the transaction to the bank end of day file.

Reconciliation sub-element 37 is responsible for responding to reconciliation actions taken by controllers and cardholders. This sub-element receives data from the cardholders' interaction with the web site and associates individual transactions with specific items purchased. Data entry of the receipt (item) information by the cardholder may or may not precede the recording of the transaction. In addition, items that are budgeted as capital equipment will have their inventory record updated to reflect the purchase price. To accomplish its task, this sub-element must create the data needed to display the recorded transactions (expenditure records), their starting reconciliation status, receive user input, update expenditure records and provide account summary data.

Upload/Download sub-element 38 is responsible for preparing data files for downloading to users and for handling the receipt of uploaded files from users. This sub-element responds to requests from authorized users to download account data, download account structure and upload account structure.

Foreign exchange sub-element 39 is responsible for processing exchange rate data and applying these rates to financial data entered by users of processor 84. This sub-element provides foreign currency conversion for all other elements of processor 84. To perform this function it must maintain a database of exchange rates and calculate the U.S. dollar equivalent amount for a transaction on any given date.

End of day sub-element 40 is responsible for performing all end of day financial data processing. This sub-element provides data files as required for reconciliation with bank 80 and card processor 82. Data files will be requested, if necessary, from bank 80 and card processor 82. It also, as necessary, produces Automated Clearing House and/or Electronic Funds Transfer files.

Discrepancy resolution sub-element 41 is responsible for processing data related to the resolution of reported discrepancies between the financial records of processor 84, bank 80, card processor 82, the client companies and individual card holders. This sub-element supports the data needs of customer services. An authorized user will query processor 84 as necessary in order to locate the detailed transaction records in question. When required, adjustment records will be created to amend recorded transactions. To perform these functions, this sub-element will format queries based on user input and, subject to the user's authority, will allow for the generation of amendment records.

Figure 6:
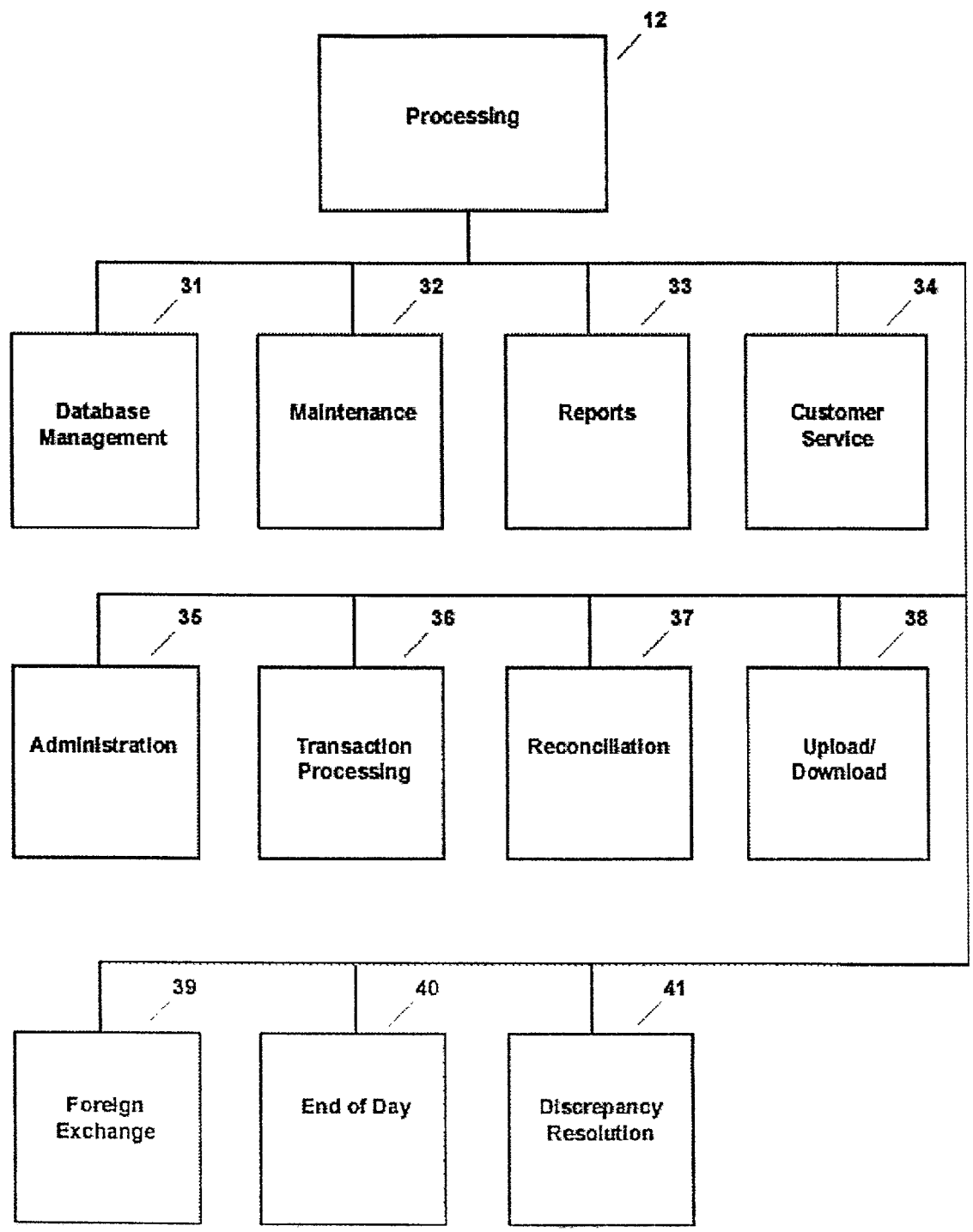
FIG. 6 is an upper-level diagram of the WWW server of the present invention.
Figure 6:
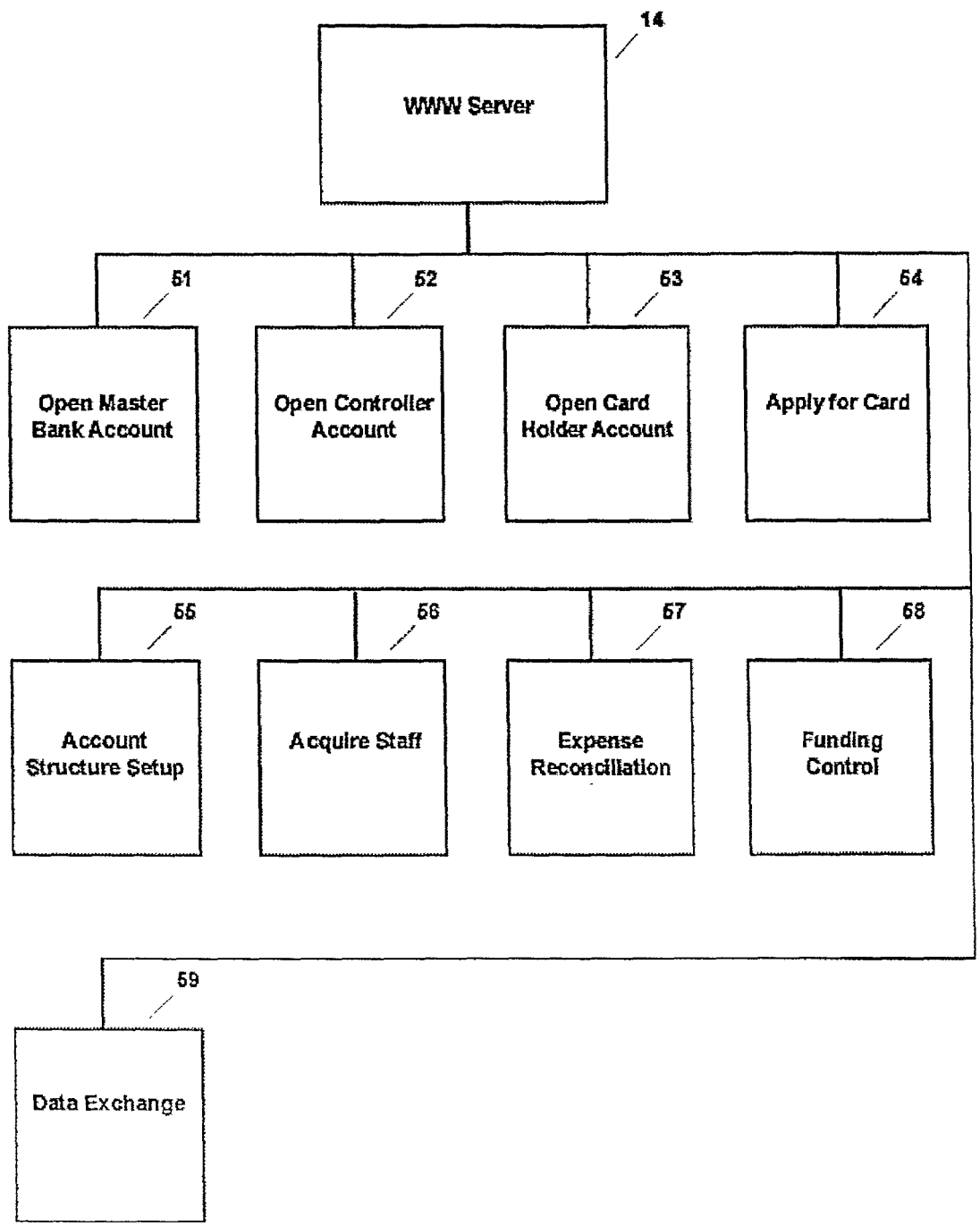

WWW Server Compute Element (WCE) 14 is the World Wide Web site of processor 84. FIG. 6 shows the level 2 structure of WCE 14. WCE 14 provides the graphical user interface to processor 84 by providing web page interaction with the user through the Internet. This will be the main interface between processor 84 and the user community. Help screens will be available for each user operation. In addition, WCE 14 will also provide a channel for marketing of services to companies and individuals. Each sub-element of WCE 14 will now be described.

Open master account sub-element 51 is responsible for processing the application for a company's master bank account. Given a master account application form, this sub-element will perform basic consistency and completeness tests on the data, create a pending master account record and create an advice to bank 80 containing the application data. Upon receipt of an approval from bank 80 or from customer service, the account will be activated.

Open controller account sub-element 52 is responsible for processing the data for associating the controller or accountant's card with a company's master account. This sub-element gives the controller the necessary authorization to manage the finances of the master account. The controller is named in the application for a master account or is added by administrative action. An account control structure is established in accordance with the a set of business rules by which processor 84 operates. This structure reflects the bounds on the controller's authority set forth in the agreement between the managing entity and the client company. These bounds may include limits on daily withdrawals from the master account, inter-card transfer amounts, total float, the number of subordinates, ATM withdrawals and individual purchases.

Open card holder account sub-element 53 is responsible for processing the application for an individual account. This sub-element receives a completed web form for opening an individual account. The account is the relationship between the managing entity and the applicant. At least one card will be issued with a new account approval. The web form application is checked for completeness and consistency before requesting that bank 80 issue the cards(s).

Apply for card sub-element 54 is responsible for processing the application for additional cards. This sub-element receives a web form request for an additional card, checks the data, and sets the status to "approval pending." Upon approval, a request for issuance is sent to bank 80 and the status is set to "issue pending." Upon activation, the status is updated to "active."

Figure 1:
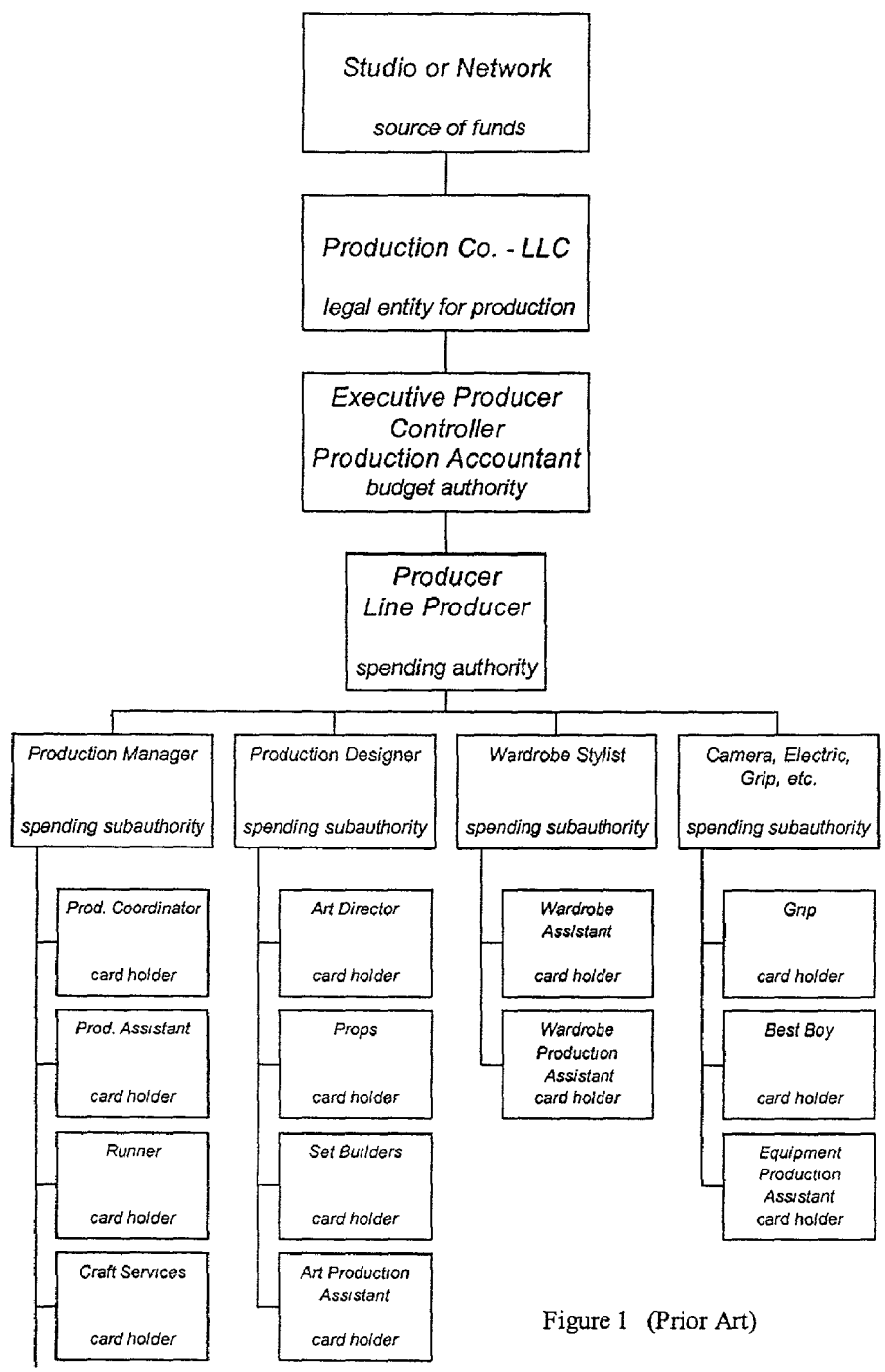
FIG. 1 is a prior art organizational diagram of a typical entertainment industry production company, for use as an example of the disclosed invention.

Account structure setup sub-element 55 is responsible for initializing and maintaining a company's account organizational structure. This sub-element allows the company's controller to establish a new account structure or alter an existing structure. The structure defines the relationship between all of the cardholders that are part of the organization. At the top is the pre-authorized controller. Beneath the controller are as many layers of structure as the controller desires to establish. In the case of a film production, as depicted in FIG. 1, the Line Producer is first spending authority, that is, they are the first level at which the authorization to spend budgeted funds is granted. In turn, the Production Manager, Production Designer, Wardrobe Stylist, Camera, Electric, Grip, etc. further authorize the expenditure of finds given to them by the Producer. They allocate funds as needed to their respective staff. Processor 84 is the vehicle for moving these funds from layer to layer as defined in the structure. Each structure element will be linked to one or more individual card holders.

A set of prototype structures will be maintained by processor 84 to assist the controller in establishing a budget structure, but no structure will be presumed. Additionally, the controller will be able to build custom structures by altering a prototype, or by editing a previously defined structure. The structure will be saved by the controller and can be downloaded for future upload on another production.

Acquire staff sub-element 56 is responsible for supporting a manager in searching for and acquiring available card holders for a company. This sub-element associates one or more individual cards with an element of the budget structure. This is the "hiring" process for the company. Using this sub-element, the controller will select a card to be associated with the management elements of the structure to a depth determined by the controller. This is accomplished after a mutual agreement is made with the card holder to be "hired." The controller may choose to fill only the next lower element(s) or any others. Any card holder, given the proper authority by a superior, will be able to repeat the "hiring" process within the scope of their authority.

Expense reconciliation sub-element 57 is responsible for processing associated with cardholders' reconciliation of expenses. This sub-element provides the card holder with the interface for reconciling outstanding purchases, requesting additional funds, and for acknowledging receipt of funds on their individual card(s). The process is similar to a check book reconciliation. Unreconciled items, whether expenses, withdrawals or fund receipts are presented for association with point of sale records or for acknowledgement. An option to enter point of sale record form the card processor is offered. The user will be able to request that additional funds be added to their account and to acknowledge that those funds were received. A dialog is also presented to allow for tailoring of the display content—show all records, sort by date/date range, sort by amount, and sort by budget item are available choices.

Funding control sub-element 58 is responsible for processing requests to change the status or limits on card accounts. Given the privileges and limits set for their account, this sub-element allows an authorized user to credit or debit funds from their card account to those reporting to them and to control the status of those cards. The user is presented with a means to select the individual card, or group of cards for which an action is to apply.

Data exchange sub-element 59 is responsible for handling the exchange of files between processor 84 and authorized users. This sub-element provides an interface for selecting a file to be uploaded to, or downloaded from processor 84 via the Internet.

Figure 7:
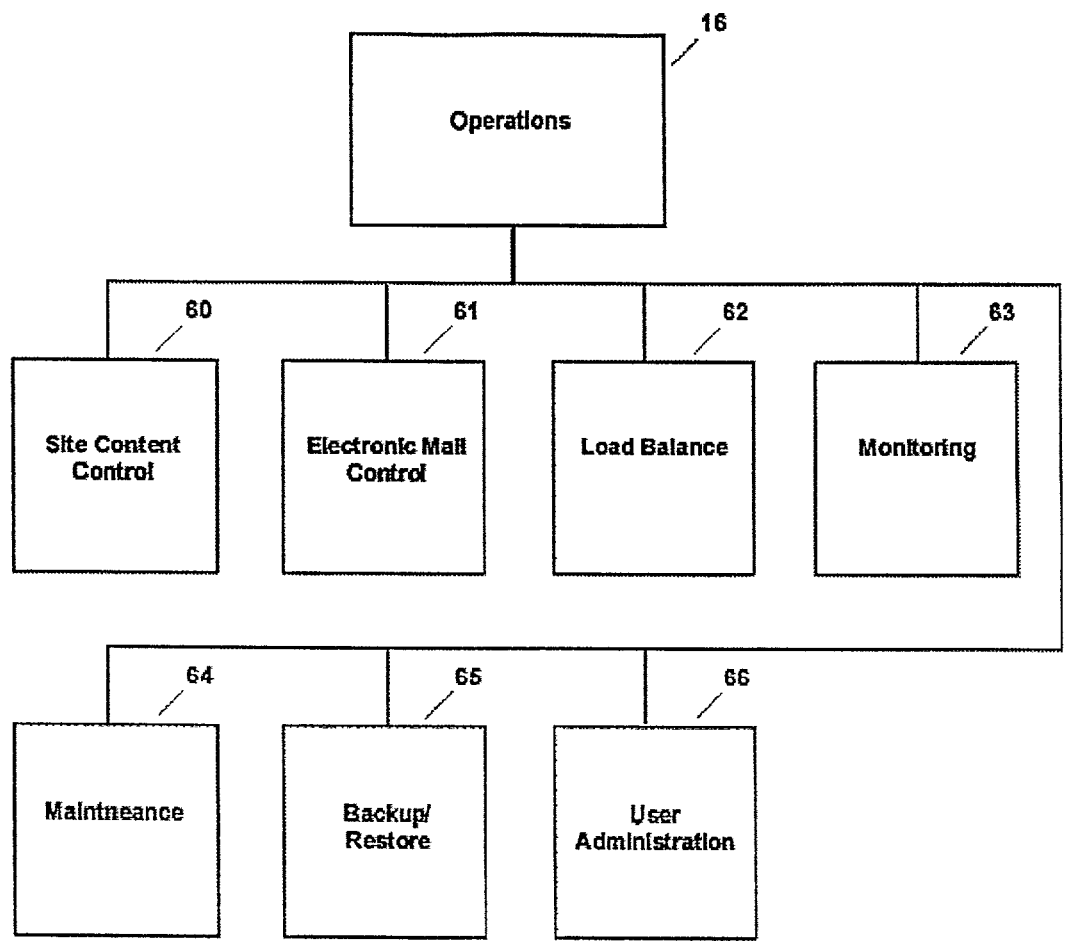
FIG. 7 is an upper-level diagram of the Operations subsystem of the present invention.

Operations Compute Element (OCE) 16 is responsible for all operational support functions within processor 84. FIG. 7 shows the level 2 structure of OCE 16. Operational personnel must have control over the entire system. To allow only authorized staff to perform functions permitted by their authority, OCE 16 acts as a controlling function. It allows web page content control, administers electronic mail accounts, adjusts system performance parameters, provides operating statistics, performs system maintenance functions, and performs data backup, restore and archive functions. Each sub-element of OCE 16 will now be described.

Site content control sub-element 60 is responsible for configuration control of the content of the web site. This sub-element maintains a database of web page content that can be changed by an authorized user. The user will be able to post changes that will take effect at the next pre-planned update cycle. Until that time, the changes will have no effect on the operation of the web site or processor 84. A provision for the immediate update of content will be available to satisfy the need for urgent and emergency changes.

Electronic mail control sub-element 61 is responsible for providing administrative control over electronic mail accounts. This sub-element maintains the electronic mail account access database. An authorized user will be able to create new mail management accounts, set passwords and set privileges for mail management users. This sub-element is also a gatekeeper to commercial mail applications.

Load balance sub-element 62 is responsible for controlling the processing load throughout processor 84. This sub-element maintains the load balance access database. An authorized user will be able to create new load balance management accounts, set password, and set privileges for load balance management users. This sub-element is also a gatekeeper to commercial load balance applications.

Monitoring sub-element 63 is responsible for monitoring and providing instantaneous and cumulative data about the performance of system. Included are computer systems, software and communications facilities. In addition, it monitors power, power backup, cooling, security and other environmental conditions. This data is available at monitoring stations attached to processor 84. Visual and audible alerts are activated to raise the attention of operations staff. Additionally, pager alerts may be sent to on-call staff during off-hours. Provisions are made for controlling the frequency and sensitivity of the monitoring systems. The security monitoring functions include both electronic security such as computer access violations and hacking, and physical security such as door entry and video recording.

Maintenance sub-element 64 is responsible for performing system maintenance functions. This sub-element maintains the database for system maintenance actions and performs the actions specified. An authorized user may edit the maintenance item database to define the actions and their frequency. Once entered, the actions are periodically scanned to determine if the action should be taken automatically or manually. Automatic items include actions such as closing, renaming, and moving files. Manual items include actions such as performing preventive maintenance. A provision of entering manual actions performed will be available.

Backup/Restore sub-element 65 is responsible for performing data backup, restore, and archive functions. This sub-element maintains the backup access database. An authorized user may create new backup management accounts, set passwords, and set privileges for backup management users. This sub-element is also a gatekeeper to commercial backup applications.

User administration sub-element 66 is responsible for maintaining and controlling system user access accounts. These accounts are those required by processor 84 to gain access to the computer systems and their files, and those required for physical access to facilities. An authorized user will be able to create new access management accounts, set passwords, and set privileges for access management users. This sub-element is also a gatekeeper to a commercial use access management application.

Figure 8:
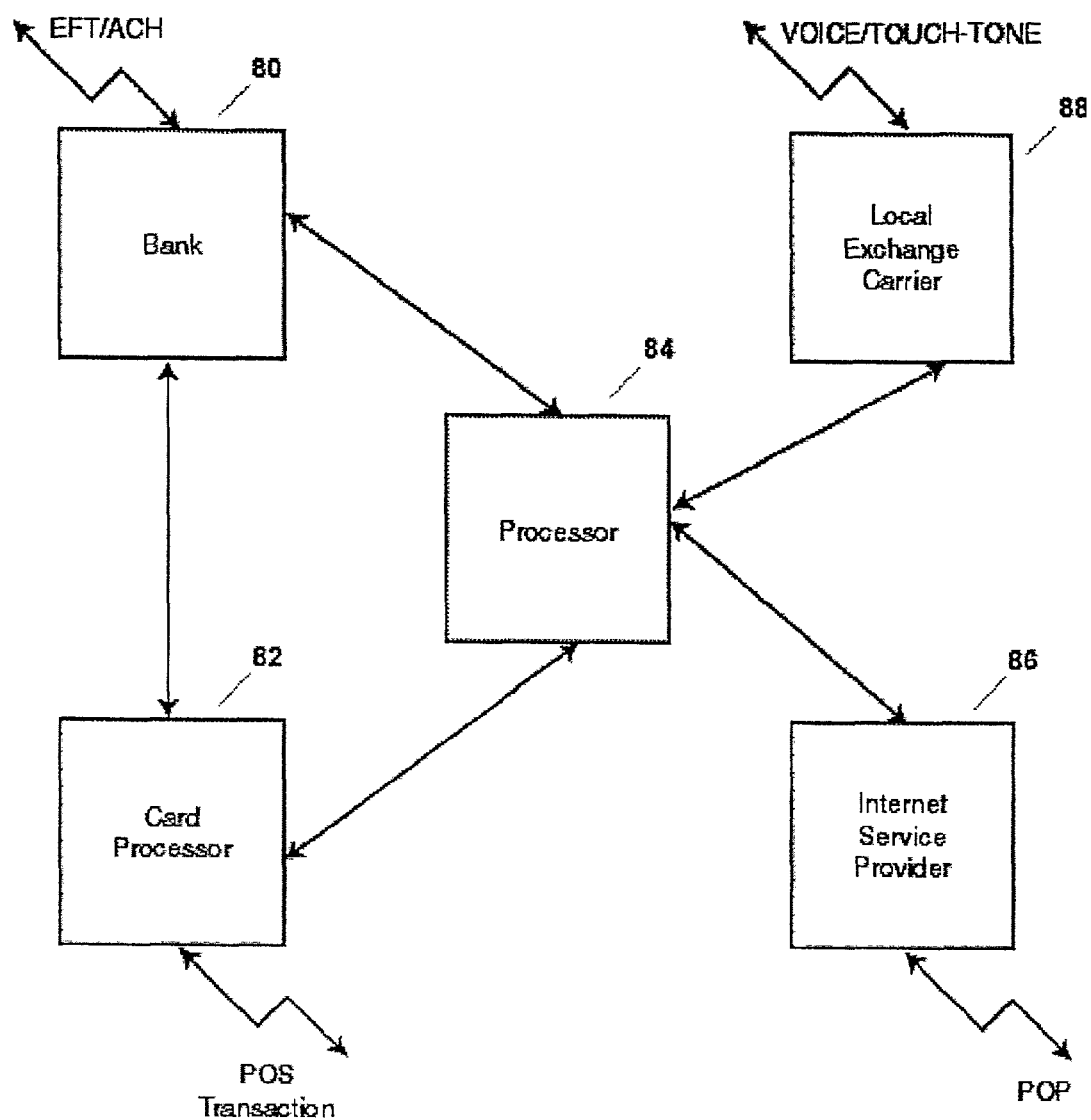
FIG. 8 is a diagram showing relationship with the system of the present invention and supporting outside entities.

It will be necessary for the managing entity to interact with various outside entities. FIG. 8 depicts the system's interconnectivity with these entities. To complete the process, it will be necessary to establish real-life relationships with these entities. The following section describes the roles played by bank 80, card processor 82, internet service provider 86, and local exchange carrier 88 in the process of the present invention.

Bank 80, under an agreement with the managing entity, maintains the accounts for the managing entity, the client companies and the individual cardholders. The primary role of bank 80 is to hold the money that will be used by the client companies to pay for the purchases made by the cardholders. In this role, bank 80 may have an established relationship with card processor 82 or may develop such a relationship.

A client company will open an account at bank 80 as a condition of their using the processor 84. Funds will be placed in this account to cover the anticipated expenditures of their hires in accordance with the policies established by bank 80 and the managing entity. Bank 80 will provide normal banking services, such as statementing, electronic funds transfer and on-line banking for this account.

Bank 80 will issue cards to individual cardholders and to the companies in their respective names. Individual card accounts will not be statemented, but will exist in accordance with the regular policies of bank 80.

Bank 80 will advise the managing entity of any additional funding the client companies deposit in their accounts. The managing entity will advise bank 80 of the movement of those funds to, from, and between individual accounts and the companies' accounts.

The managing entity will advise bank 80 of the expenditure of funds by a cardholder and the company that is responsible for those funds. At the end of each day, the managing entity will provide bank 80 with a completed transaction file containing detail records of all activity processed through the managing entity.

Bank 80 will perform any Electronic Funds Transfers, settlements or Automated Clearing House functions necessary to complete the financial transactions associated with the process of the invention.

Card processor 82, under an agreement with the managing entity and bank 80, will act as the authorizer of point-of-sale transactions conducted by individual cardholders.

As an authorizer, card processor 82 will maintain the expenditure limit for each card. Changes to the card limits resulting from the activities of the companies' authorized funds managers will be provided by the managing entity to card processor 82 in real-time.

Card processor 82 will provide the managing entity with an advice each time a card is used. This same advice will be provided to bank 80. At the end of each day, card processor 82 will provide both the managing entity and bank 80 with a completed transaction file containing detailed transaction records for each transaction.

Internet service provider (ISP) 84, under an agreement with the managing entity, will provide access to the Internet and provide other communications management functions.

ISP 84 may, or may not have a relationship with bank 80, card processor 82, the client companies, and the individual cardholders. No such direct relationships are required. Their relationship is strictly with the managing entity.

Using its connection to the Internet backbone, ISP 84 will act as the conduit through which users of the World Wide Web site will be able to reach that site from any computer with Internet access. In addition, ISP 84 will allow for the use of Virtual Private Network technology by the managing entity's operational and administrative staff.

This invention has been described in terms of an example using the entertainment industry, and, specifically, using a production company to show the uses of the invention. The invention is not meant to be limited thereby, but, instead, is generally applicable to any industry or business utilizing petty cash for day-to-day purchases. The scope of the invention is embodied in the claims which follow.

We claim:

1. A system for the payment of petty cash disbursements comprising:
a private network for managing the payment of petty cash disbursements, the private network comprising:
a master account set up within the private network, said master account linked to a bank account via a main processor, said bank account having a predetermined amount of funds deposited therein by a funding entity;
a first level of one or more subordinate pre-paid purchasing card accounts set up within the private network and linked to said master account via the main processor, each of the first level subordinate pre-paid purchasing card accounts having a first amount of pre-paid funds deposited therein, wherein each first level subordinate pre-paid purchasing card account is associated with a card held by a user for making purchases up to the first amount of pre-paid funds, wherein purchases made using said card are approved by a credit card processor linked to the main processor; and
a second level of one or more subordinate pre-paid purchasing card accounts set up within the private network and linked to one or more of said first level subordinate pre-paid purchasing card accounts via the main processor, each of the second level subordinate pre-paid purchasing card accounts having a second amount of pre-paid funds deposited therein, wherein each second level subordinate pre-paid purchasing card account is associated with a card held by a user for making purchases up to the second amount of pre-paid funds, wherein purchases made using said card are approved by the credit card processor linked to the main processor;
wherein the first amount of pre-paid funds are unique to each of the first level subordinate pre-paid purchasing card accounts, and wherein the second amount of pre-paid funds are unique to each of the second level subordinate pre-paid purchasing card accounts;
wherein the funding entity has the authority to authorize the transfer and deposit of pre-paid funds to said master account to cover purchases made using that master account and to any subordinate pre-paid purchasing card account linked to said master account, either directly or indirectly;
wherein an owner of any of said pre-paid purchasing card accounts has the authority to authorize the transfer of pre-paid funds from its own account to any subordinate pre-paid purchasing card account linked thereto; and
wherein said cards associated with any of said first level or second level subordinate pre-paid purchasing card accounts are re-usable within other private networks set up within the system.

2. The system of claim 1 wherein each of said subordinate pre-paid purchasing card accounts has a maximum pre-paid deposit limit.

3. The system of claim 2 wherein requests for the modification of said maximum pre-paid deposit limit for any subordinate pre-paid purchasing card account and the authorization of said modification are accomplished in real time.

4. The system of claim 3 wherein said requests and said authorizations are facilitated by a web site available over the Internet.

5. The system of claim 3 wherein said requests and said authorizations are facilitated by a voice recognition facility.

6. The system of claim 2 further comprising a software application running on a computer system.

7. The system of claim 6 wherein said software application is configured to establish communications with outside entities.

8. The system of claim 7 wherein said communications with outside entities are:
encrypted prior to sending and decrypted after receiving to ensure data integrity and security; and
entered into a log file for audit and customer support purposes.

9. The system of claim 8 wherein said software application establishes communication with a bank, said bank maintaining said bank account.

10. The system of claim 9 wherein said software application initiates a transaction at said bank to move pre-paid funds between said bank account and said subordinate pre-paid purchasing card accounts.

11. The system of claim 8 wherein said software application establishes communications with the credit card processor, wherein said software application is configured to instruct said credit card processor to modify said maximum pre-paid deposit limit for any of said subordinate pre-paid purchasing card accounts.

12. The system of claim 11 wherein said credit card processor exchanges data with said software application, said exchanged data advising said software application of purchases made using any of said purchasing cards.

13. The system of claim 1 wherein any of said pre-paid purchasing card accounts has the authority to create and break links to and from purchasing card accounts subordinate thereto.

14. A system for the payment of petty cash disbursements comprising:
a private network for managing the payment of petty cash disbursements, the private network including a software application running on a computer system and including a main processor, said computer system being connected to the Internet;
a master account set up within the private network, said master account linked to a bank account via the main processor, said bank account having a predetermined amount of funds deposited therein by a funding entity; and
a plurality of subordinate pre-paid purchasing card accounts set up within the private network, each of the plurality of subordinate pre-paid purchasing card accounts logically linked to said master account either directly or indirectly via other subordinate pre-paid purchasing card accounts, each of the plurality of subordinate pre-paid purchasing card accounts having a first amount of pre-paid funds deposited therein, wherein each of the plurality of subordinate pre-paid purchasing card accounts is associated with a card held by a user for making purchases up to the first amount of pre-paid funds, wherein purchases made using said card are approved by a credit card processor linked to the main processor;
wherein the first amount of pre-paid funds are unique to each of the plurality of subordinate pre-paid purchasing card accounts;
wherein the main processor controls said linking of the plurality of subordinate pre-paid purchasing card accounts and maintains a maximum pre-paid deposit limit for each of the plurality of subordinate pre-paid purchasing card accounts; and
wherein said cards associated with any of said plurality of subordinate pre-paid purchasing card accounts are re-usable within other private networks set up within the system.

15. The system of claim 14 further comprising:
a web site controlled by said software application;
wherein said software application receives secured instructions via said web site regarding the control of said links between said plurality of subordinate pre-paid purchasing card accounts and said maximum pre-paid deposit limit for each of said plurality of subordinate pre-paid purchasing card accounts.

16. The system of claim 15 wherein said software application further comprises means for communicating with a bank, said bank maintaining said bank account.

17. The system of claim 16 wherein all communications between said bank and said software application are secured by encryption.

18. The system of claim 16 wherein said communications between said bank and said software application includes data regarding the transfer of funds from said master account to each of said plurality of subordinate pre-paid purchasing card accounts.

19. The system of claim 15 wherein said software application further comprises means for communicating with the credit card processor, said credit card processor being responsible for the authorization of purchases made with each of said purchasing cards.

20. The system of claim 19 wherein all communications between said credit card processor and said software application are secured by encryption.

21. The system of claim 19 wherein said communications between said credit card processor and said software application include:
data regarding changes in said maximum pre-paid deposit limits for each of said plurality of subordinate pre-paid purchasing card accounts; and
information regarding authorized purchases for each of said purchasing cards.

22. A method for the payment of petty cash disbursements comprising the steps of:
establishing a private network for the payment of petty cash disbursements;
establishing a bank account at a bank having a predetermined amount of funds deposited therein by a funding entity, said bank account associated with the private network;
linking a master account set up within the private network to said bank account via a main processor; and
linking a plurality of subordinate pre-paid purchasing card accounts set up within the private network to said master account either directly or indirectly via other subordinate pre-paid purchasing card accounts, each of the plurality of subordinate pre-paid purchasing card accounts having a first amount of pre-paid funds deposited therein, wherein each of the plurality of subordinate pre-paid purchasing card accounts is associated with a card held by a user for making purchases up to the first amount of pre-paid funds, wherein purchases made using said card are approved by a credit card processor linked to the main processor;

wherein the first amount of pre-paid funds are unique to each of the plurality of subordinate pre-paid purchasing card accounts;

wherein said cards associated with any of said plurality of subordinate pre-paid purchasing card accounts are re-usable within other private networks set up within the system.

23. The system of claim 14 wherein any of said pre-paid purchasing card accounts has the authority to create and break links to and from purchasing card accounts subordinate thereto.

24. A method for the payment of petty cash disbursements comprising the steps of:

establishing a private network for the payment of petty cash disbursements;

establishing a bank account at a bank having a predetermined amount of funds deposited therein by a funding entity, said bank account associated with the private network;

linking a master account set up within the private network to said bank account via a main processor; and linking a plurality of subordinate pre-paid purchasing card accounts set up within the private network to said master account either directly or indirectly via other subordinate pre-paid purchasing card accounts, each of the plurality of subordinate pre-paid purchasing card accounts having a first amount of pre-paid funds deposited therein, wherein each of the plurality of subordinate pre-paid purchasing card accounts is associated with a card held by a user for making purchases up to the first amount of pre-paid funds, wherein purchases made using said card are approved by a credit card processor linked to the main processor;

wherein said cards associated with any of said plurality of subordinate pre-paid purchasing card accounts are re-usable within other private networks set up within the system.

25. The method of claim 24 wherein each of said plurality of subordinate pre-paid purchasing card accounts has a maximum pre-paid deposit limit, the method further comprising the steps of:

electronically transferring instructions to an external credit card processing entity regarding changes to said maximum pre-paid deposit limits for said plurality of subordinate pre-paid purchasing card accounts;

electronically receiving from said external credit card processing entity information regarding approved purchases for said purchasing cards; and electronically transferring instructions to said bank regarding the transfer of funds from said bank account to said plurality of subordinate pre-paid purchasing card accounts to cover purchases made.

26. The method of claim 25 further comprising the step of maintaining a web site wherein secured instructions are received regarding (a) changes in said maximum pre-paid deposit limits for said plurality of subordinate pre-paid purchasing card accounts, and (b) linking of said plurality of subordinate pre-paid purchasing card accounts to one another.

27. The method of claim 25 further comprising the step of maintaining a voice recognition facility wherein secured instructions are received regarding (a) changes in said maximum pre-paid deposit limits for said plurality of subordinate pre-paid purchasing card accounts, and (b) linking of said plurality of subordinate pre-paid purchasing card accounts to one another.

28. The method of claim 24 wherein any of said pre-paid purchasing card accounts has the authority to create and break links to and from purchasing card accounts subordinate thereto.

* * * * *